United States Patent [19]

Javan

[11] Patent Number: 4,864,587
[45] Date of Patent: Sep. 5, 1989

[54] MULTIPLE BEAM GAS LASER AND METHOD

[75] Inventor: Ali Javan, Cambridge, Mass.

[73] Assignee: Laser Science, Inc., Cambridge, Mass.

[21] Appl. No.: 902,613

[22] Filed: Sep. 2, 1986

Related U.S. Application Data

[63] Continuation-in-part of Ser. No. 683,180, Dec. 18, 1984, abandoned.

[51] Int. Cl.$^4$ .............................................. H01S 3/082
[52] U.S. Cl. ........................................ 372/97; 372/32; 372/83; 372/107; 372/700
[58] Field of Search ................. 372/18, 20, 32, 83, 372/87, 97, 107, 700

[56] References Cited

U.S. PATENT DOCUMENTS

| | | | |
|---|---|---|---|
| 3,959,739 | 5/1976 | Hutcheson et al. | 331/94.5 C |
| 4,217,558 | 8/1980 | Aprahamian et al. | 372/58 |
| 4,316,157 | 2/1982 | Dosi et al. | 372/59 |
| 4,507,788 | 3/1985 | Barnie et al. | 372/83 |
| 4,618,960 | 10/1986 | Nazemi | 331/94.5 C |

OTHER PUBLICATIONS

Rudko et al., Review of Scientific Instruments 53(4), p. 6, lines 8–16.

Primary Examiner—William L. Sikes
Assistant Examiner—Robert E. Wise

[57] ABSTRACT

A pulsed gas laser having two spaced optical resonators each associated with a pair of high voltage electrodes. The first and second pairs of electrodes are positioned within a common plasma chamber including means for circulating a laser gas successively between the two pairs of electrodes. A common heat exchanger removes the heat energy from the two regions of plasma excitation. A high voltage pulse generator connected to the electrodes includes timing means for delaying the application of high voltage pulses to the second pair of electrodes, the delay being either (a) less than the time required for an acoustic shock wave to travel through the lasing gas from the first to the second pair of electrodes or (b) longer than the time required for the shock wave created by the discharge of the first pair of electrodes to die out. Each optical resonator is provided with an adjustable mirror arranged to reflect laser pulses to and from a mirror grating. The mirrors are adjusted angularly to change the wavelength of the laser pulses.

11 Claims, 3 Drawing Sheets

MULTIPLE BEAM GAS LASER AND METHOD

CROSS REFERENCE TO RELATED APPLICATION

This application is a continuation-in part of Application Ser. No. 683,180 filed Dec. 18, 1984, now abandoned.

BACKGROUND OF THE INVENTION

1. Field of the Invention:

This invention relates to a multiple-beam laser and more particularly to gas lasers capable of producing multiple independent pulsed laser beams, with the same or different wavelengths, at relatively high pulse repetition rates.

2. Description of Related Art:

There are a number of applications requiring laser beams that can be changed quickly from one wavelength to another. For example, in the remote detection of gases, such as chemical agents in the atmosphere, a line-tunable pulsed $CO_2$ laser can be arranged to probe the absorption spectrum of the trace gas to be detected.

In such a remote sensing system, a laser pulse at a first $CO_2$ line is transmitted through the atmosphere in the direction of the target area to be searched. The diffused back-scattered laser energy from a remote topographical target, or from atmospheric aerosoles, is detected by a receiver at the laser transmitter location. In the well-known differential LIDAR or DIAL measurement, the transmitted pulse is first tuned to a $CO_2$ laser line at a wavelength near coincidence with an absorption line of the trace gas to be searched for. The laser wavelength is subsequently switched to another $CO_2$ laser line at a wavelength removed from the absorption lines of the trace gas. The intensities of the two back-scattered or reflected signals from the target area are compared as a measure of the degree of absorption at the absorption line of the trace gas and therefore as a measure of the particular trace gas present in the atmosphere. For more detailed diagnostic and identification purposes, and to distinguish from spurious gases that might interfere with the identification, it is necessary to probe several absorption lines of the trace gas it is desired to detect.

Lasers using one adjustable mirror grating in which the wavelength can be manually adjusted by changing the angle of the grating are well-known. However, to minimize variations caused by atmospheric turbulence between successive pulses it is desirable that the successive pulses at different wavelengths occur within some relatively short time interval. The maximum acceptable time interval is so short as to render manually tunable laser systems impractical.

One known method for rapid wavelength tuning utilizes a rotating grating in a wavelength tunable grating resonator. The grating is used in Littrow for operation at a given laser line. In Littrow, a collimated ray at one particular wavelength incident on the grating is reflected from the grating along a direction exactly opposite from that of the incident collimated ray. Wavelength selectivity comes about because in Littrow the angle of incidence is dependent upon wavelength. The position of the rotatable mirror is reused in the course of its rotation by firing the pulsed laser at a moment when the grating is position to cause laser action at a preselected $CO_2$ laser line.

In practice because of the high inertia of the relatively massive grating required for use with a high-intensity laser, the grating is mounted in a fixed position, but its image is moved by changing the angle of a mirror positioned to intercept the laser beam. In such a system, the resonator consists of one fixed mirror, one rotating mirror and one fixed grating. As the mirror rotates, the angle of incidence on the grating changes causing the wavelength at which the Littrow reflection occurs to change correspondingly.

The position of the mirror rotation is reused by reflection of a collimated light, such as a He-Ne laser beam, from the rotating mirror, and the use of an array of linear detectors. In practice, this method can be used for wavelength switching at a relatively slow speed of about one-fiftieth of a second. This limitation is because of the practical difficulties in extracting a fast rise electrical signal to reuse the position of the rotating mirror. Although it is possible to fire the laser repetitively on the same pulse line, corresponding to the same mirror position, from pulse to pulse, there is difficulty in switching the operating laser to another preselected line. This is in part because the build-up of energy in different lines occurs with different time delays with respect to the trigger pulse which switches on the laser.

Instead of a continuously rotating mirror, a torque mirror can be used to turn the mirror, but bring it to rest under the control of an electrical signal. The laser is fired while the mirror is in a fixed position. This arrangement eliminates the problem caused by the time delays of the energy build-up. The process can then be repeated by choosing the next line and turning the mirror to the corresponding position. That solution, however, is limited by the practical capabilities of existing torque motors. The mirror must have a relatively large mass or it will suffer distortion during the deceleration that brings it to a halt. The resulting inertia of the mirror limits the switching speed, using commercially available torque motors, to 5 to 10 milliseconds.

However, to avoid signal fluctuations caused by air turbulence occurring between successive pulses in long range remote detection applications, it is necessary that the time interval between two successive pulses on different $CO_2$ laser lines be less than one millisecond.

One method of meeting the time interval requirement is to use two different lasers operating at different wavelengths, triggered to produce successive pulses with nay predetermined time interval. The interval can be adjusted from microseconds to milliseconds or, if required, even longer.

However, the use of two laser systems introduces additional problems, including that of cost, that have limited its practical application In particular, if the lasers must be of relatively high intensity and operate at a pulse repetition rate of tens of hertz or higher, each laser must be provided with a gas recirculation and regeneration system, heat removal devices and other associated intricate mechanisms and components necessary to permit stable operation at such high pulse repetition rates. The necessary complexity and bulk are particularly undesirable for applications requiring field use.

A structure that combines several lasers to produce a single pulse output is described in U.S. Pat. No. 4,217,558 entitled "Pulsed Chemical Laser System". In that arrangement, a plurality of separate chemical lasers are arranged along a cylindrical path and each output pulse from the lasers is combined to form a single pulse equal to the summation of all of the individual lasers. Here, all lasers operate at the same wavelength and each laser has its own independent fuel input and output arrangement. The elements common to the laser group are a master timer for firing the lasers successively and a mirror system for combining the individual laser beams.

A laser having a physical structure somewhat similar to the one described here, but having only one optical path is described in the Review of Scientific Instruments 53(4) 1982 in an article entitled "High-repetition rate, recirculating hydrogen/deuterium fluoride laser: by R. I. Ridko, Z. Drozdowicz, and S. Linhares, and in the co-pending U.S. Patent application of Said Nazemi, Ser. No. 06/573,003 filed Jan. 23, 1984 and now U.S. Pat. No. 4,618,960 entitled "Gas Laser with Acoustic Baffle", and assigned to the same assignee as the present application.

U.S. Pat. No. 4,507,788 to James W. Barnie et al. describes a laser system capable of producing multiple pulses comprising a single optical resonator having multiple discharge regions and multiple sets of electrodes and preionizers The optical resonator is folded and the beam passes through all of the discharge regions. The system set forth in the Barnie patent, however, could not be used in he application described above and that patent suggest no modification that would enable it to meet those requirements. First, the Barnie patent only discloses a laser having a single folded resonant chamber and it is not capable of operating at two different wavelengths. Moreover, the requirement for a short interval between successive pulses cannot be met by the Barnie structure. For example, if a difference of 10 microseconds is desired between the two successive pulses, the Barnie structure cannot provide it. The first electrodes to be pulsed produce an absorbing region that persists for a significant period after after the laser pulse in that region is terminated During this period, the generation of a second laser pulse by the other pair of electrodes is prevented. The Barnie structure requires a minimum time delay of the order of 50 milliseconds to allow time for the absorbency to disappear. Even if a forced gas flow were added to the Barnie structure, which is not suggested, the minimum interval would be of the order of 0.5 milliseconds. A far shorter time interval between pulses is required for the present application.

SUMMARY OF THE INVENTION

A single laser plasma chamber includes two or more pairs of high voltage electrodes and associated optical paths capable of initiating separate laser actions at the same or different wavelengths. Common associated optical paths capable of initiating separate laser actions at the same or different wavelengths. Common associated mechanisms provide for a continuous annular gas flow between each set of electrodes, removal of heat, and recirculation and regeneration of the laser gas.

Each set of electrodes is provided with its own laser resonator that controls the wavelength of the laser beam. The arrangement produces parallel plasma regions that are configured for a multiple resonator with an independent optical path for each pair of electrodes. Each resonator is independently tunable to a desired wavelength. A common gas flow mechanism produces the necessary gas recirculation in the multiple plasma regions. The plasma chamber is also provided with a common heat exchanger that removes the heat generated in the two plasma regions.

The separate output beams at different wavelengths can be arranged with parallel paths. The electrodes are fired at selected time intervals by triggering the plasma-current pulses at appropriate times. In some arrangements it is desirable to trigger the downstream plasma region first so its waste gas will not reach the preceding set of electrodes so quickly. The entire plasma in the region between each pair of electrodes, produced by the current pulse that causes thew laser action, is removed from between the electrodes and replaced with fresh gas before the next high voltage impulse is applied to the electrodes.

The time delay between the high voltage pulse that fires a first set of electrodes and the pulse that fires the second set of electrodes is shorter than the time it takes for the shock wave caused by the firing of the first set of electrodes to propagate through the laser gas to the second set of electrodes, or alternatively, the interval is long enough to permit the disturbance to die out before the second set of electrodes is fired.

DESCRIPTION OF THE PREFERRED EMBODIMENT

Figure 1:
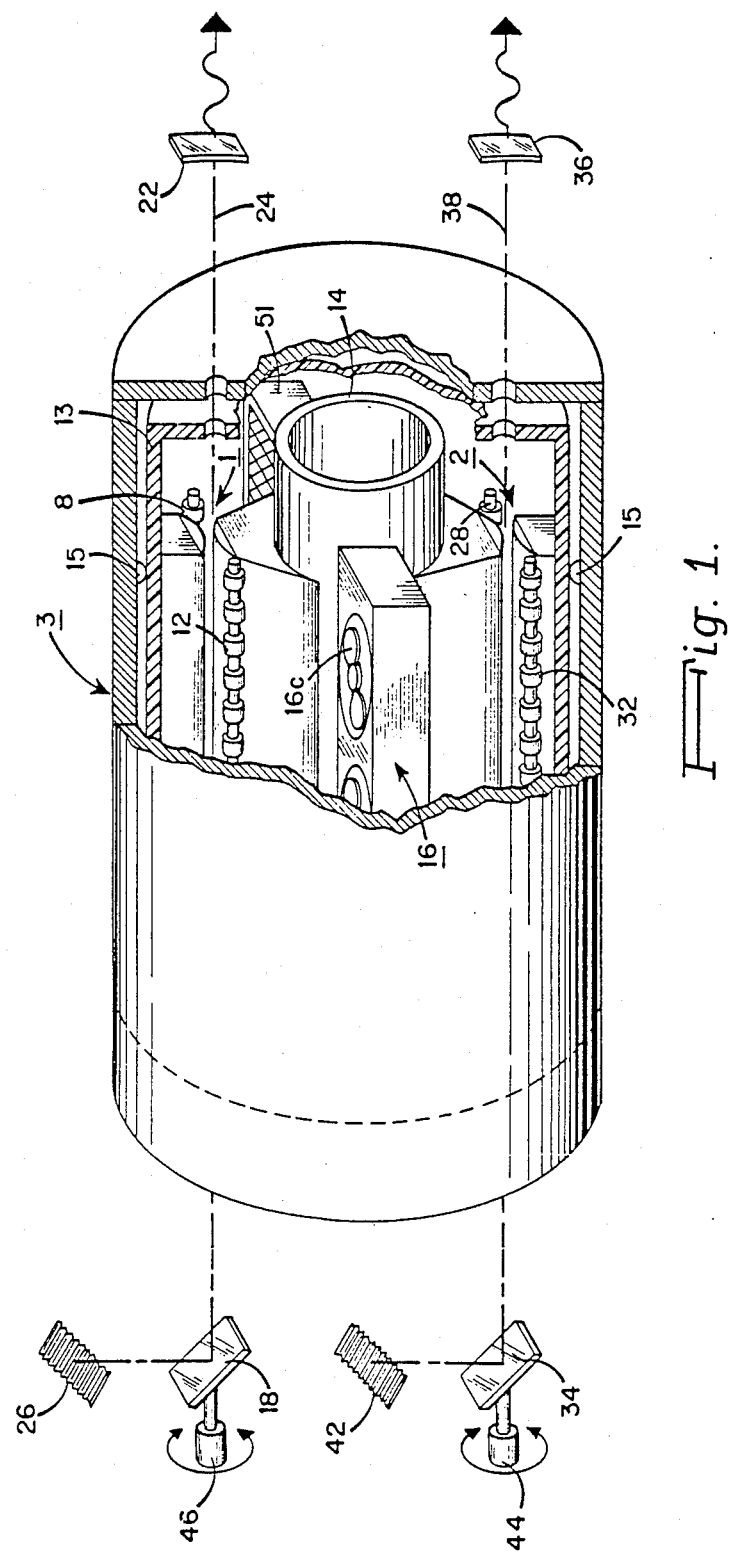
FIG. 1 is a diagramatic view, partially cut away, illustrating the construction of a gas laser embodying the invention.

In the embodiment illustrated here, two pairs of high voltage electrodes, generally indicated at 1 and 2, are mounted within a cylindrical housing, generally indicated at 3. (See FIGS. 2-3). The first pair of electrodes 1 comprises spaced parallel electrodes 1a and 1b. A pair of spaced pre-ionizer electrodes 8 and 12 are positioned along opposite sides of the gap between the electrodes 1a and 1b.

An annular plastic chamber is formed between the inner surface of a plastic cylinder 14. The plastic cylinder 13 is supported by the outer housing 3 by means of resilient support spacers 15. Carbon dioxide gas fills the annular chamber, at approximately atmospheric pressure, and is caused to circulate around the annular path by a blower, generally indicated at 16, comprising three high-speed fans 16a, 16b, and 16c.

The electrodes 1 function in the usual manner to produce an electrical discharge across the gap between the electrodes 1a and 1b immediately subsequent to the application of a pre-ionizing impulse to the electrodes 8 and 12. Pulse laser resonance is produced by two mirrors 18 and 22 positioned at opposite ends of the housing to produce a laser beam 24. The precise wavelength of the laser beam 24 is controlled by a mirror grating 26 which is arranged to receive and reflect the laser beam 24 from the mirror 18. The grating reflects the laser beam at the angle of incidence for the one particular wavelength, which corresponds to the wavelength of the laser beam. The wavelength of the beam 24 is adjusted by changing the angle of the mirror 18.

The laser construction described to this point, other than for the electrodes 2 and the grating 26, is similar to that described in the application of Nazemi referenced above. The second pair of electrodes 2 comprises electrodes 2a and 2b positioned within the annular gas path at a point opposite from the electrodes 1. A second pair of pre-ionizer electrodes 28 and 32 are positioned on opposite sides of the gap between the electrodes 2a and 2b. These electrodes in conjunction with a pair of mirrors 34 and 36 produce a pulsed laser beam 38 which may be at the same or a different wavelength from that produced by the electrodes 1. The beam from the mirror 34 is reflected by a mirror grating 42 at the precise angle of incidence for one particular wavelength. To adjust the wavelength of the laser beam 38, the angle of the mirror 34 is adjusted by a servo motor 44 or other drive means. In a similar manner the wavelength of the laser beam 24 is adjusted by changing the angle of the mirror 18 by a servo motor 46 or other drive means.

Figure 2:
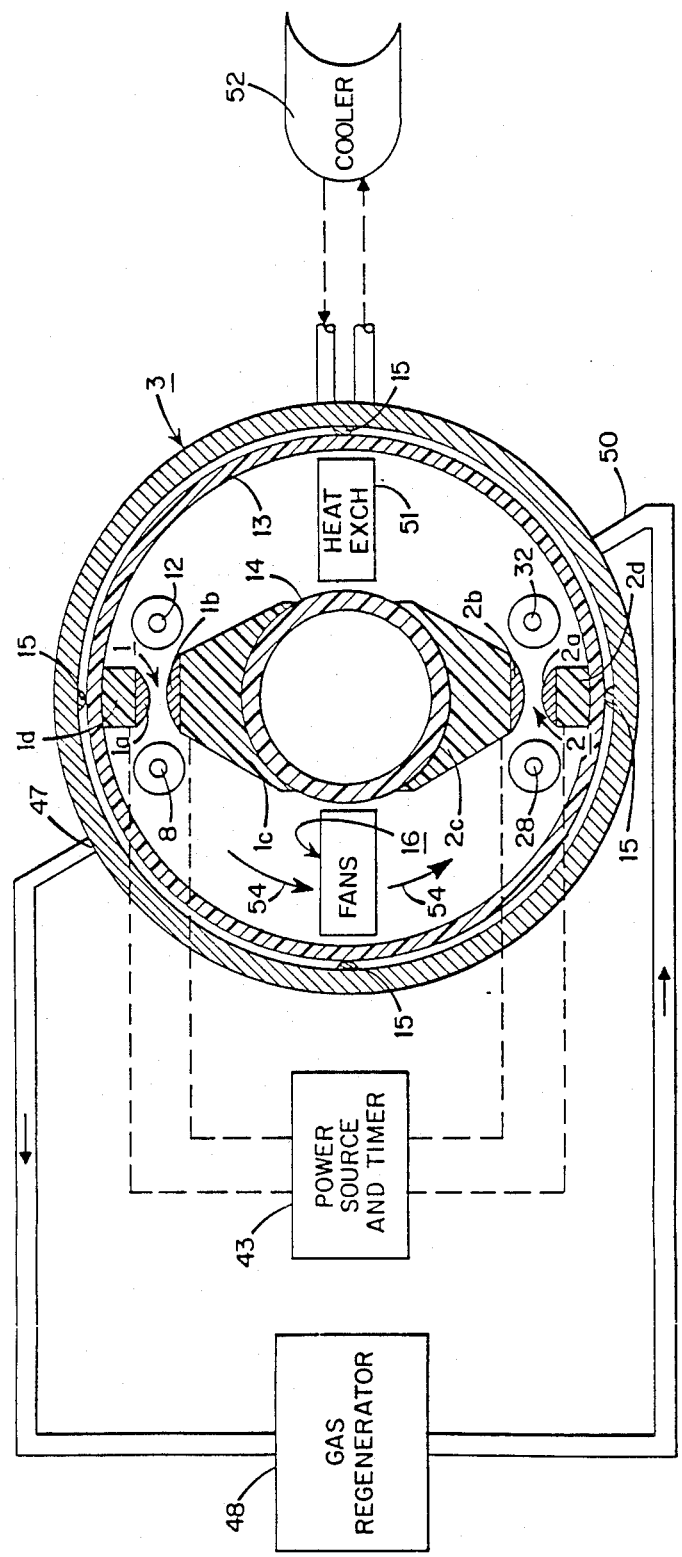
FIG. 2 is a diagramatic longitudinal sectional view of the laser for the purpose of illustrating the operation of the laser shown in FIG. 1.
Figure 3:
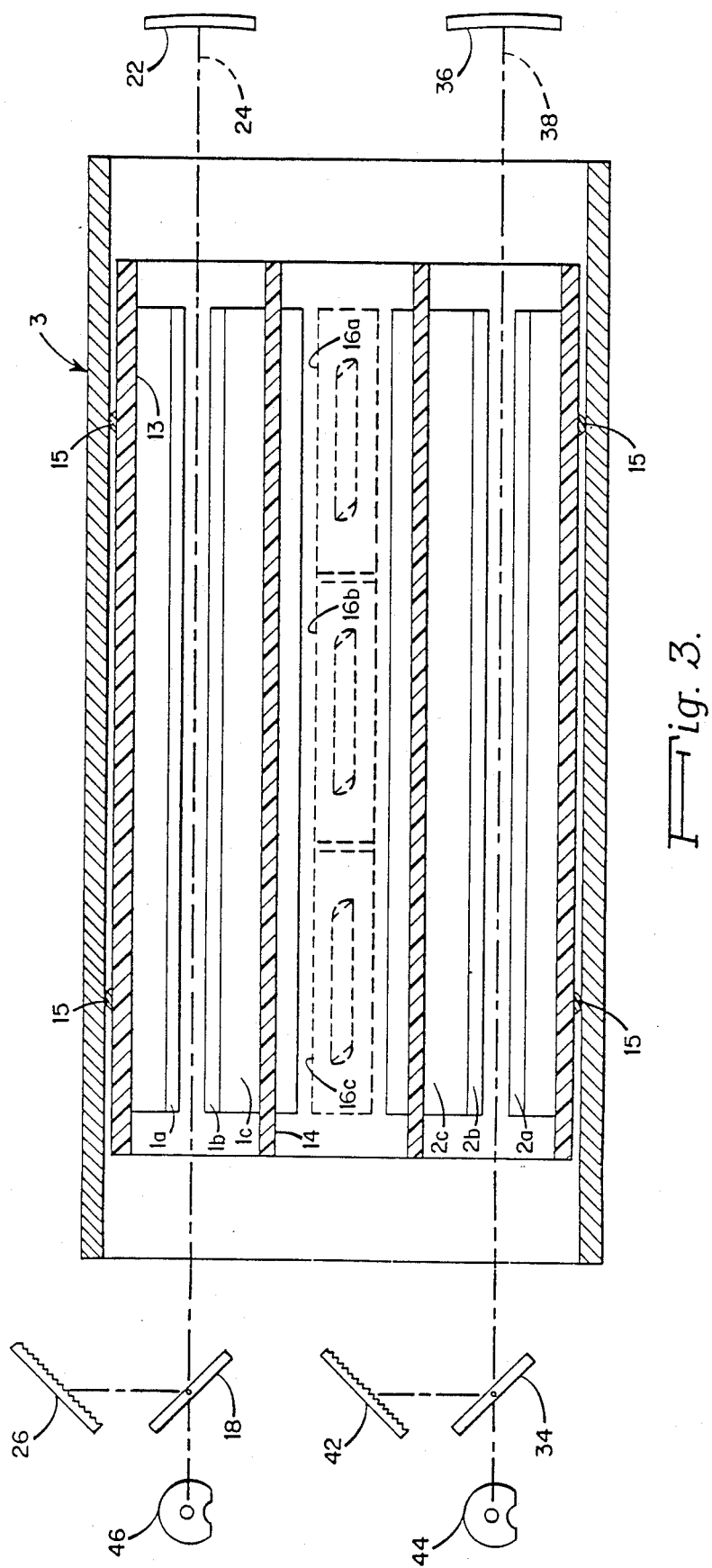
FIG. 3 is a longitudinal section through the center line of FIG. 2.

Conventional pulse generator power sources and a timing mechanism are provided for energizing the pre-ionizer and high voltage electrodes and are indicated here only diagrammatically in block form at 43 in FIG. 2. The power source 43 includes appropriate timing means of a known type that permits any predetermined interval between the pulse that fires the electrodes 1 and the pulse that fires the electrodes 2.

The gas within the chamber is constantly refreshed by withdrawing gas through an exit orifice 47 and introducing fresh gas, either new or which has been reconstituted by a conventional gas regeneration system 48, through an inlet orifice 50.

Cooling of the laser gas is provided by a conventional heat exchanger unit 51, positioned in the annular gas flow path, which is connected to a cooling mechanism indicated at 52.

When a pulse discharge takes place between the electrodes 1a and 1b, a shock wave is created that travels, at substantially the speed of sound, along the annular path in the direction of the gas flow, indicated by the arrows 54, to the electrodes 2.

The time delay between the high voltage pulse that fires the electrodes 1 and the pulse that fires the electrodes 2 must satisfy one of two conditions: (a) It must be shorter than the time required for sound wave propagation from the plasma region of the electrodes 1 to the plasma region of the electrodes 2. This is because the current pulse in each plasma region causes a shock wave which propagates at the speed of sound and the triggering of the plasma in the region of the electrodes 2 should take place before the arrival of the shock wave from the plasma region of the electrodes 1; or (b). Alternatively, the plasma pulse in the region of the electrodes 2 may be triggered after the acoustic disturbance caused by the shock wave created by the plasma in the region of electrodes 1 has died down. This delay may be as short as one millisecond in a well-designed laser.

The mechanical construction may be generally similar to that described in the above-mentioned co-pending application. The high voltage electrodes 1b and 2b and the pre-ionizer electrodes may be supported respectively from the inner cylinder 14 by plastic strips 1c and 2c, and the other high voltage electrodes 1a and 2a may be supported from the outer cylinder 13 respectively by plastic strips 1d and 2d, or other support structures may be provided.

In operation, the electrodes 1 may be triggered to produce a laser pulse at a first $CO_2$ line followed by a second pulse applied to the electrodes 2 after a delay shorter than the time required for the disturbance created between the first pair of electrodes 1 to travel downstream through the gas to the region of the second set of electrodes 2. The optical resonance path associated with the electrodes 2 produces a laser pulse at the wavelength of another $CO_2$ line.

The successive laser pulses need not be separated by equal time intervals. For example, the laser pulse resulting from the discharge of the electrodes 1 may be followed almost immediately by the pulse resulting from the discharge between the electrodes 2. The pair of laser pulses this created may be used to probe for a particular trace gas by comparison of the relative absorption of the two wavelengths. This action may be followed by a longer time interval during which the acoustic disturbances in the $CO_2$ gas are allowed to die out, after which the cycle is repeated by successively firing the electrodes 1 and 2.

The laser construction described here illustrates two optical paths within one plasma chamber, however, depending upon the particular application, additional optical paths may be added to permit generation of three or more laser beams.

The electrodes shown here are positioned symmetrically with respect to the annular gas flow, but if desirable the electrodes may be positioned asymmetrically. Such an arrangement maybe desired when the laser pulses are not separated by equal time intervals and comprise a burst of pulses separated by a longer time interval.

I claim:
1. In combination:
a housing,
a laser gas within said housing,
a first laser resonator including
    a first pair of high voltage electrodes, disposed in substantially parallel, spaced relationship within said housing, for producing a discharge pulse therebetween in response to a voltage pulse applied thereto, and
    first mirror means, including at least one partially transmissive mirror, for producing laser resonance in said first laser resonator induced by said discharge pulse between said first pair of electrodes and producing a laser output at a first selectable frequency, and
a second laser resonator including
    a second pair of high voltage electrodes, disposed in substantially parallel relationship within said housing, for producing a discharge pulse therebetween in response to a voltage pulse applied thereto, and
    second mirror means, including at least one partially transmissive mirror, for producing laser resonance in said second laser resonator induced by said discharge pulse between said second pair of electrodes and producing a laser output at a second selectable frequency.
2. The combination as claimed in claim 1 including circulation means arranged to propel said gas along a path passing successively between said first and second pairs of electrodes.
3. The combination as claimed in claim 2 wherein said first mirror means includes
    a first, partially transmissive mirror, and
    a mirror grating, oppositely disposed from said first mirror relative to said first pair of electrodes, for receiving laser energy from and reflecting laser energy to said first mirror along an optical path thereby to produce laser resonance at a preselected wavelength.
4. The combination as claimed in claim 3 including means for adjusting the angle of said mirror grating relative to said first pair of electrodes thereby to change the wavelength of said laser resonance.

5. The combination as claimed in claim 3 including a second mirror interposed in the optical path between said first mirror and said mirror grating, and means for changing the angle of said second mirror with respect to said mirror grating thereby to change the wavelength of said laser resonance.

6. The combination as claimed in claim 1 including timing means for applying a first high voltage pulse to said first pair of electrodes and a subsequent high voltage pulse to said second pair of electrodes a predetermined time interval after said first high voltage pulse.

7. The combination as claimed in claim 6 wherein said time interval is less than the time required for an acoustic wave to travel through said gas from said first to said second pair of electrodes.

8. A method of generating a plurality of laser pulses at different wavelengths comprising the steps of
providing a housing having therein first and second spaced pairs of electrodes.
filling said housing with a laser gas,
providing first and second optical resonators associated respectively with said first and second pairs of electrodes and each including a partially transmissive mirror,
adjusting one of said optical resonators to provide a resonance wavelength different from the resonance wavelength of the other optical resonator, and
applying first and second high voltage pulses respectively to said first and second pairs of electrodes thereby to produce first and second laser pulses at said different wavelengths.

9. The method as claimed in claim 8 including the step of
producing a continuous flow of said gas within said housing passing sequentially through the regions between said first and second pairs of electrodes.

10. The method as claimed in claim 8 including the step of
delaying the application of said second pulse to said second pair of electrodes after the application of said first pulse to said first set of electrodes for a time interval less than the time required for an acoustic shock wave to travel through said gas from said first to said second pair of electrodes.

11. The method as claimed in claim 10 wherein said first optical resonator includes an adjustable mirror and a mirror grating positioned to receive said first laser pulse from and reflect said first laser pulse to said adjustable mirror, said step of adjusting one of the optical resonators including the step of adjusting said adjustable mirror to change the wavelength of said first laser pulse.

* * * * *

UNITED STATES PATENT AND TRADEMARK OFFICE
CERTIFICATE OF CORRECTION

PATENT NO. : 4,864,587
DATED : September 5, 1989
INVENTOR(S) : Ali Javan

It is certified that error appears in the above-identified patent and that said Letters Patent is hereby corrected as shown below:

Col. 2, line 46, replace "nay" with --any--.

Col. 3, line 24, replace "he" with --the--.

Col. 3, line 37, delete "after" (second occurrence).

Col. 3, line 37, insert --.-- after "terminated".

Col. 4, line 9, delete "4" before "current".

Col. 4, line 9, replace "thew" with --the--.

Col. 4, line 23, replace "diagramatic" with --diagrammatic--.

Col. 4, line 26, replace "diagramatic" with --diagrammatic--.

Col. 5, lines 47 and 48, delete ". Alternatively".

Col. 6, line 23, replace "maybe" with --may be--.

Signed and Sealed this

Third Day of April, 1990

*Attest:*

HARRY F. MANBECK, JR.

*Attesting Officer*　　　　　*Commissioner of Patents and Trademarks*